United States Patent [19]

Isobe et al.

[11] 4,317,627
[45] Mar. 2, 1982

[54] INDEX MECHANISM FOR COUPLING CONTROL OF OPERATIONAL LENS UNITS

[75] Inventors: Takashi Isobe, Tokyo; Masao Aoyagi, Yokohama, Japan

[73] Assignee: Canon Kabushiki Kaisha, Tokyo, Japan

[21] Appl. No.: 159,310

[22] Filed: Jun. 13, 1980

Related U.S. Application Data

[63] Continuation of Ser. No. 949,522, Oct. 10, 1978, abandoned.

[30] Foreign Application Priority Data

Oct. 15, 1977 [JP] Japan .................................. 52-123681

[51] Int. Cl.³ .......................... G03B 17/14; G03B 7/02
[52] U.S. Cl. ..................................... 354/286; 350/257
[58] Field of Search ............... 354/202, 270, 272, 273, 354/286, 40, 41, 46, 288; 350/252, 257

[56] References Cited

.U.S. PATENT DOCUMENTS

| | | | |
|---|---|---|---|
| 3,067,665 | 12/1962 | Gebele et al. | 354/272 |
| 3,388,647 | 6/1968 | Yajima | 354/286 |
| 3,620,149 | 11/1971 | Ogihara | 354/286 X |
| 3,675,550 | 7/1972 | Ishizaka | 354/46 |
| 3,682,069 | 8/1972 | Lecoeur | 354/286 X |
| 3,722,390 | 3/1973 | Schlapp et al. | 354/286 X |
| 3,858,225 | 12/1974 | Hasegawa et al. | 354/286 X |
| 3,864,707 | 12/1975 | Shirasaki | 354/272 X |
| 3,906,534 | 9/1975 | Shirasaki | 354/286 |
| 4,003,068 | 1/1977 | Hashimoto et al. | 354/286 |
| 4,062,030 | 12/1977 | Starp | 354/286 |
| 4,230,403 | 10/1980 | Hashimoto et al. | 354/286 |

*Primary Examiner*—Donald A. Griffin
*Attorney, Agent, or Firm*—Toren, McGeady & Stanger

[57] ABSTRACT

An interchangeable lens unit is formed with an adapter shell rotatable relative to a unit housing and maintained stationary along with signal members of a diaphragm therein during coupling and decoupling of the lens unit effected by rotating a bayonet fixedly carried on the unit housing relative to a camera body. In rotating the unit in a loosening direction, an index mechanism operates to permit disengagement of a female bayonet of the unit away from a male bayonet of the camera body only when the unit housing is accurately oriented relative to the adapter shell. In a later coupling operation, it is therefore insured that the signal members can be brought into operative connection with respective operational members of a diaphragm control mechanism which is disposed in the camera body despite the presence of a significant clearance between the male and female bayonets.

15 Claims, 12 Drawing Figures

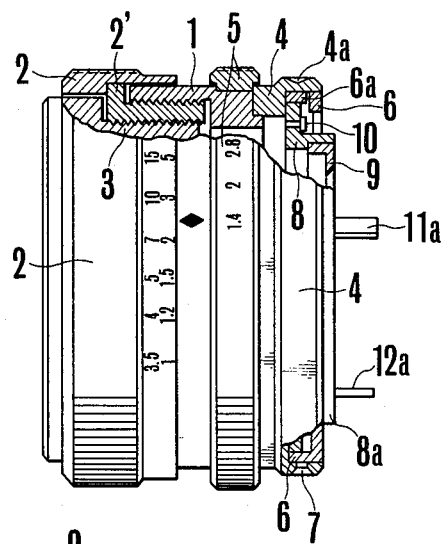
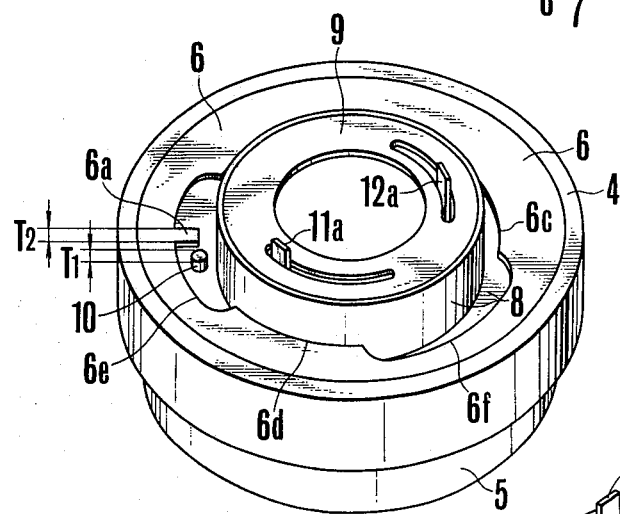
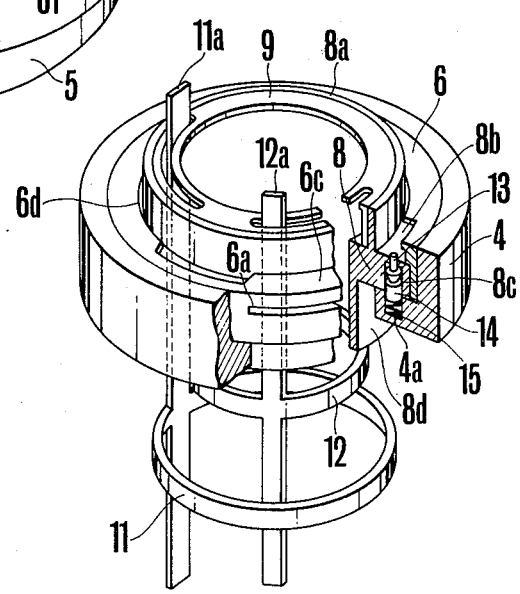

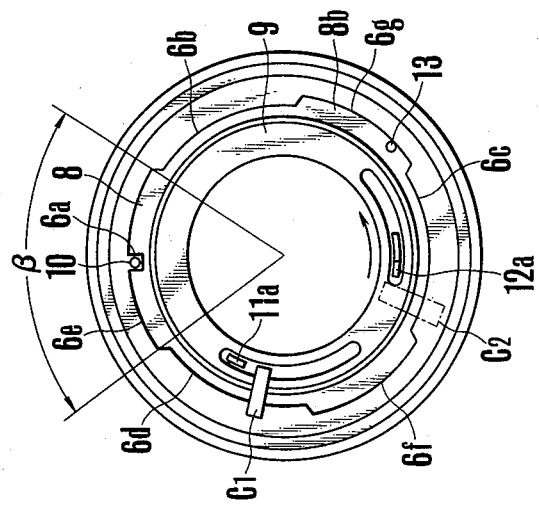
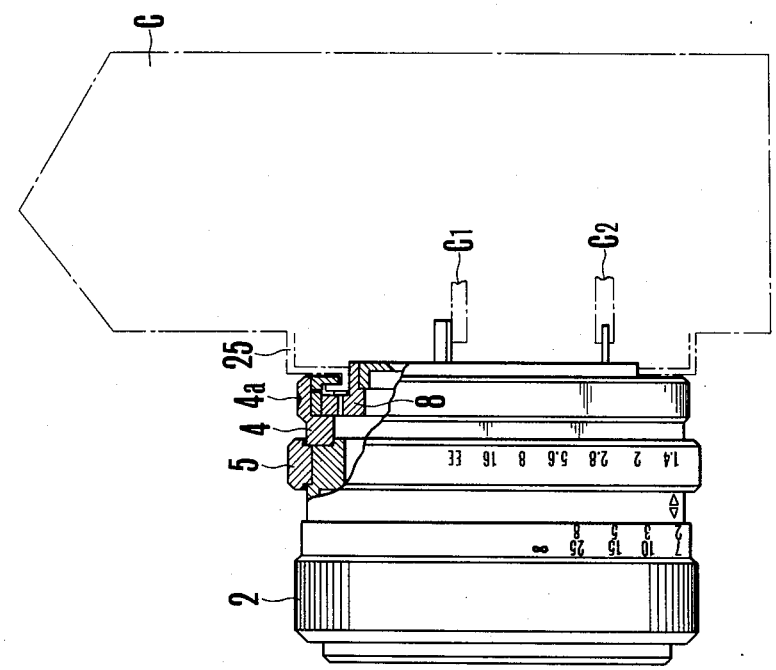
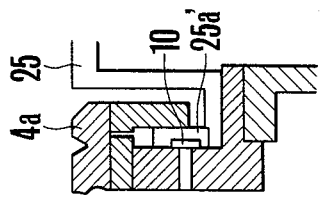

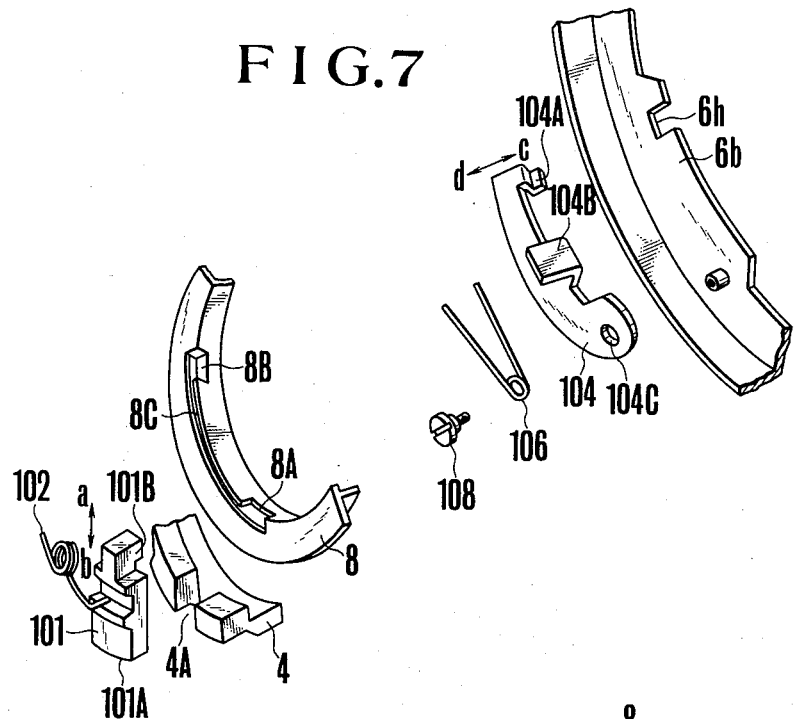
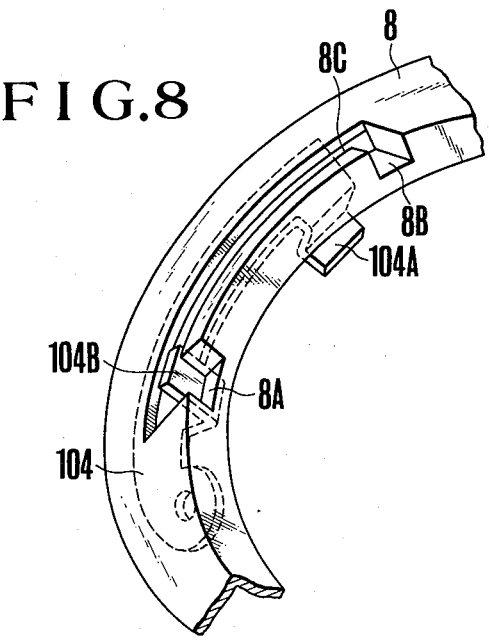

INDEX MECHANISM FOR COUPLING CONTROL OF OPERATIONAL LENS UNITS

This is a continuation of application Ser. No. 949,522 filed Oct. 10, 1978 and now abandoned.

BACKGROUND OF THE INVENTION

This invention relates to cameras with interchangeable lens units, and more particularly to an index mechanism for controlling orientation of a unit bayonet relative to a diaphragm in the unit when decoupling the unit from a camera body thereby to facilitate later coupling of the unit by establishment of an operative connection between the diaphragm and a control mechanism which is positioned in the camera body.

It is known to provide an interchangeable lens unit, having a coupling element or bayonet fixedly mounted on the housing thereof, with an adapter shell of the unit which is rotatable relative to the housing to enable a diaphragm to cooperate with a control mechanism incorporated in a camera body after the bayonet is rotated in a tightening direction. It has been common practice to provide a significant clearance between the bayonet of the unit and a bayonet on the camera body so that coupling and decoupling are facilitated. With a mechanical unit of the type described, however, this clearance often leads to disorientation of the unit housing from the adapter shell when decoupling the unit from the camera body. As a result, later coupling is made impossible as there occurs mechanical interference between an angular position adjusting pin and the wall of the camera housing near a receptor for the pin and between the signal members and the operational members of the control mechanism.

It is an object of the present invention, to eliminate such conventional drawbacks and to provide a camera with an interchangeable lens unit which is detachable after the coupling element of the unit is accurately oriented relative to an angular position adjusting pin on the adapter shell which is rotatable relative to the unit housing and coupling element.

Another object of the present invention is to provide a coupling arrangement between a lens unit and a camera body provided with an index mechanism for controlling the orientation of the unit relative to the camera body during decoupling.

Still another object of the invention is to provide an interchangeable lens unit capable of being reliably and quickly coupled with a camera body while preventing the occurrence of mechanical interference between a signal member of a diaphragm in the unit and an operational member of a control mechanism for the diaphragm in the camera body.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

SUMMARY OF THE INVENTION

Briefly, the invention relates to a lens assembly including a lens barrel with a bayonet by which it may be attached to the bayonet of a camera body. The lens assembly includes a signal member for transmitting signals between the camera body and the lens assembly, and reference means for determining an attachment reference position between the lens assembly and the camera body, the reference means having a position matching portion for enabling attachment of the lens assembly with the camera body with the signal member in its normal operative position with respect to the camera body. Detachment means enabling detachment of the lens barrel from the camera body operate to enable the barrel to be detached with the bayonet of the lens barrel in a position where it is ready to be disengaged from the bayonet of the camera body and with the signal member returned to a position which is the same as that which is occupied before the lens barrel was attached to the camera body.

BRIEF DESCRIPTION OF THE DRAWINGS

In the drawings:

FIG. 1 is an elevational view of an interchangeable lens unit with a portion broken away, illustrating a first embodiment of the present invention;

FIGS. 2A and 2B are perspective views of the unit of FIG. 1 with FIG. 2A showing an indexing tip arrangement and with FIG. 2B showing an example of the construction and arrangement of a locking device;

FIG. 3 is a rear elevational view of the unit of FIG. 1 utilized to measure the angular distance of each recess in the unit bayonet;

FIG. 4A is a schematic side view showing the operative connection between signal members of a diaphragm in the unit and control members therefor in a camera body as the unit is oriented relative to the camera body;

FIG. 4B is a fragmentary sectional view in an enlarged scale of the adapter shell anchorage mechanism;

FIGS. 7 through 9 inclusive show a second embodiment of the index mechanism according to the invention, with FIG. 7 being an exploded perspective view of the index mechanism and a unit housing locking mechanism, FIG. 8 being a fragmentary perspective view showing the arrangement of the indexing lever in the tightened position, and FIG. 9 being a perspective view showing the indexing lever and locking button in the tightened position.

DESCRIPTION OF THE PREFERRED EMBODIMENTS

Figure 5:
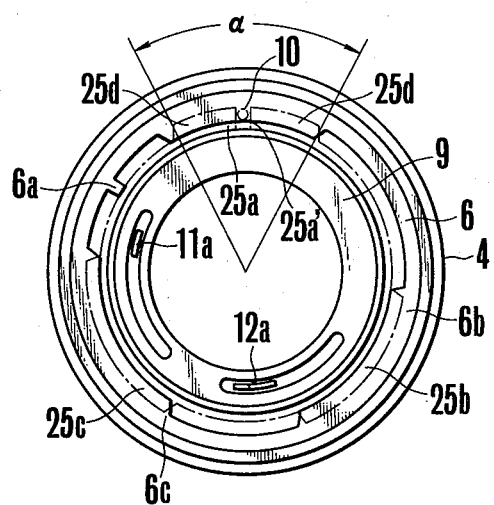
FIG. 5 is a rear elevational view of the lens unit in the tightened position showing the indexing tip displaced from axial alignment with an anchorage pin, whereby measurement of the displacement distance may be defined.
Figure 6:
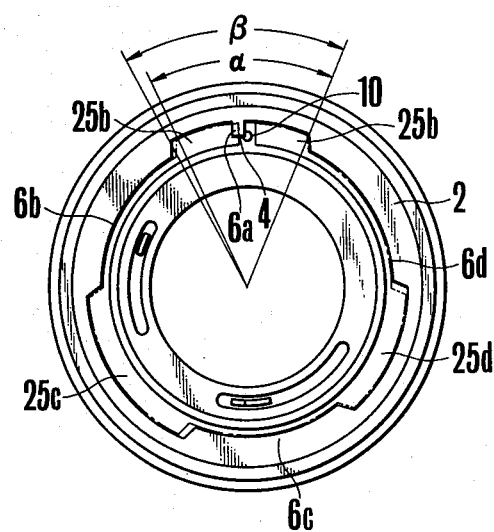
FIG. 6 is a view similar to FIG. 5 considered to define the clearance between the bayonets on the unit and the camera body whereby the indexing tip and the anchorage pin are caused to be axially offset.

Referring to FIGS. 1 to 6, there is shown one embodiment of the present invention applied to an interchangeable lens unit of the type described. The unit includes a main support tube or lens barrel 1 having mounted at the front end thereof a distance adjusting or focusing ring 2 which is rotatably and axially shiftable. The ring 2 is moved in unison with an intermediate sleeve 2' having external and internal surfaces both screw-threaded to engage respectively with screw-threads on the inner diameter of an enlarged bore in the front end of the tube 1 and the outer diameter of a lens cell 3 in which a focusing member of an objective lens (not shown) is mounted. A collet 4 extending rearwardly of the tube 1 is fixedly secured thereto. A diaphragm ring 5 is rotatably fitted in a circumferential groove in the tube 1 adjacent to the collet 4. A coupling element or female bayonet 6 is fitted to the inner diameter of the collet 4 and is fastened by a screw 7 to the collet 4. A radial flange of an adapter shell 8 is freely fitted in the front bore of the bayonet 6 and is seated against the radial shoulder of the collet 4. The adapter shell 8 has a rear end cross-wall 9 through which two arcuate slots are formed in concentric relation to the optical axis of the lens at an angular separation of about 90° from each other.

The unit further includes a diaphragm (not shown) having a diaphragm presetting ring 11 whose position is adjusted by the diaphragm ring 5, when in the manual mode of exposure control, or by an automatic exposure control apparatus in the camera body through an output member C1 engaging an arm 11a of the presetting ring, the arm 11a extending through and outwardly beyond one of the two arcuate slots. In the diaphragm preselection automatic exposure mode, the preselected value of the exposure aperture is introduced through the arm 11a into the exposure control apparatus. The diaphragm is closed down to the presetting value by an operating member 12a, which extends through and outwardly beyond the other slot, as the member 12a is actuated by an output member C2 of a coordination control mechanism in the camera body.

In order to insure that, when the unit is coupled with the camera body, the signal members 11a and 12a are made ready for operative connection with the control members C1 and C2, there is provided a mechanism for adjusting the angular position of the adapter shell 8 relative to the camera body and for maintaining the adapter shell stationary when the unit is turned in a tightening or loosening direction. This mechanism comprises a pin 10 fixedly mounted on the radial flange of the adapter shell 8 extending into a space behind a recess 6e between the bayonet pawls 6b, 6d and a detent groove 25a' (FIG. 4B) formed in the top pawl 25b of the camera body bayonet 25.

The angular extension of each male bayonet pawl defined by α is made smaller than that of the corresponding female bayonet recess which is defined by β to provide a significant clearance β-α. The larger the clearance, the higher will be the speed of the coupling and decoupling operation. At the same time, however, there will be an increased probability of encountering disorientation of the adapter shell 8 relative to the unit housing and bayonet 6 when the unit is decoupled from the camera body. This leads to an increase in the possibility of mechanical interference occurring between the signal members 11a and 12a and the control members C1 and C2 in later coupling of the unit with a camera body.

To avoid this, there is provided an index mechanism comprising an indexing tip 6a—formed as part of the bayonet 6 and arranged so that when the adapted shell 8 is appropriately oriented relative to the bayonet 6 the tip 6a is axially aligned with the pin 10—and a spline slot 25a formed by undercutting the detent groove 25a' for the pin 10 through the entire thickness of the wall of the male bayonet pawl 25b. As a result, the width T2 of the indexing tip 6a is determined so as to be equal to or slightly smaller than the diameter T1 of the pin 10, as shown in FIG. 2A.

In decoupling the unit from the camera body, the operator first turns the unit housing about the optical axis of the lens in the loosening direction from the position shown in FIG. 5. When the unit bayonet 6 is indexed to align the indexing tip 6a with the spline slot 25a, the operator can detach the unit from the camera body with the adapter shell 8 appropriately oriented relative to the unit housing. In a later coupling operation, therefore, the operator need only be concerned with whether an index mark 4a on the outer surface of the collet 4 is axially aligned with a corresponding mark on the camera body.

FIG. 2B shows a mechanism for restraining the adapter shell 8 from accidental rotative movement after the unit is detached. This mechanism includes an actuating pin 13 movably fitted in an axial hole 8c formed through the wall of the radial flange 8b of the adapter shell 8, and a detent pin 14 seated in a fitted axial hole 4b formed in the inturned radial flange of a collet 4 and biased by an expansion spring 15 to project into the accommodating hole 8c when the actuating pin 13 is not depressed, or when the unit is detached from the camera body. When the adapter shell 8 is slidably inserted into the bore of the camera housing to an adequate axial extent, the interface between the actuator pin 13 and the detent pin 14 is moved to coincide with that between the adapter shell 8 and the collet 4 to enable the operator to turn the collet 4 with the bayonet 6 about the optical axis in the tightening direction, while maintaining the adapter shell 8 stationary relative to the camera body, with the pin 10 being retained by the detent slot 25a'. After the appropriate orientation of the adapter shell 8 relative to the unit housing and collet 4 is reestablished, the detent pin 14 lies across the interface between the adapter shell 8 and the collet 4.

Figure 9:
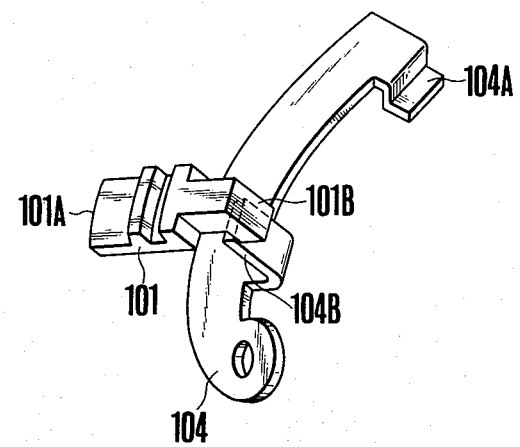

Referring to FIGS. 7 to 9, there is shown another embodiment of the index mechanism according to the present invention associated with a device for locking the unit either in a fully tightened position, or in an appropriately oriented position. The device comprises a slide 101 forming a button 101A at the bottom end thereof and slidably fitted in a radial hole 4A which is formed in the thickened front part of the collet 4 adjacent the front shoulder of the flange of the adapter shell 8, a bias spring 102 urging the slide 101 to move downward so that the button 101A is projected outwardly beyond the hole 4A. Two detent radial recesses 8A and 8B provided through the wall of the cylindrical part of the adapter shell 8 at the front edge thereof are arranged to receive a rearwardly extending projection 101B of the slide 101 when the unit is set in the tightened and oriented positions respectively.

The index mechanism comprises an indexing lever 104 pivotally mounted on the inturned radial extension 6b (see FIG. 5) at 104C by a cap screw 108, and a hairpin spring 106 tensioned between the cylindrical part of the bayonet 6 and a rectangularly bent-off portion 104B of the indexing lever 104 to rack the unit with the pawl 25b of the camera body bayonet 25. A slot 8c formed in the adapter shell 8 between the recesses 8A and 8B operates to permit movement of the lug 104B therethrough as shown in FIG. 8, when the bayonet 6 is moved relative to the stationary adapter shell 8. With the unit set in the appropriately, oriented position, the projection 101B drops in the recess 8B, and the indexing lever 104 is turned about the pivot pin 108 in a counterclockwise direction against the force of the spring 106, whereby a hooked portion 104A is taken out of latching connection with the bayonet pawl 25b, as it is retracted into the cutout 6h. After the button 101A is depressed, the operator can turn the collet 4 in a clockwise direction as viewed in FIG. 7. Since the adapter shell 8 is maintained stationary by the connection of pin 10 and slot 25a, the projection 101B is slidingly moved on the internal surface of the adapter shell 8, while the indexing lever 104 is allowed to slidingly move at its hooked portion 104A on the top land of the bayonet pawl 25b under the action of the spring 106. When the slide projection 101B arrives at the recess 8A, the slide 101 is moved downwardly or in the direction indicated by an arrow b under the action of the spring 102 to lock the unit in the tightened position as shown in FIG. 5. To decouple the unit from the camera body, the operator first depresses the bottom 101A, and then turns the unit in the reversed direction until the slide projection 101B drops into the recess 8B. Such movement of the slide 101 causes engagement of the projection 101B with the lug 104B as shown in FIG. 9 followed by counterclockwise movement of the lever 104A which in turn causes the hooked portion 104 to be retracted into the cutout 6h from the engagement with the bayonet pawl 25b. Therefore, the operator can detach the unit from the camera body.

Figure 10:
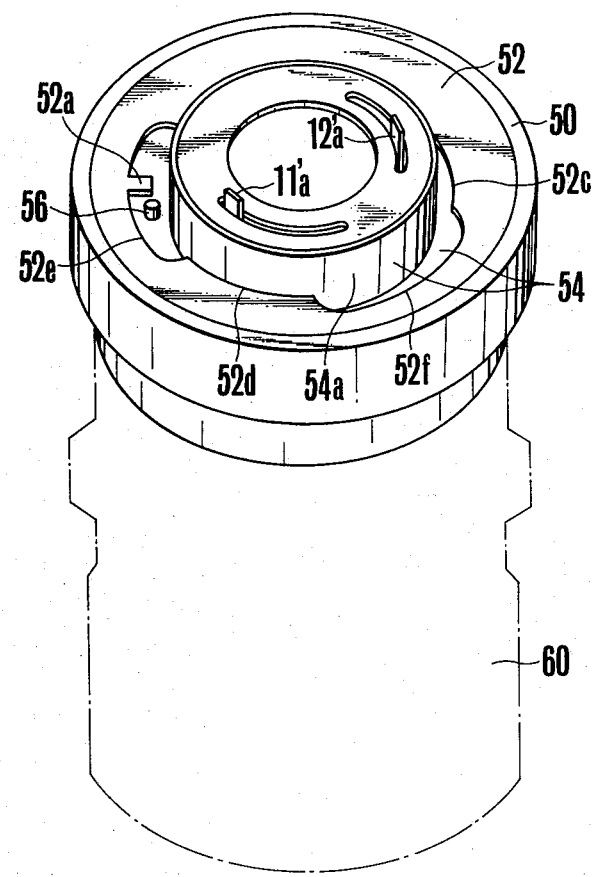
FIG. 10 is a perspective view showing another example of an application of the invention to an accessory such as an intermediate ring for a camera objective.

The present invention is also applicable to adapters such as intermediate tubes for close-up photography and filter frames. FIG. 10 shows an example of an application to an intermediate tube. A support sleeve 50 of the intermediate tube has a bayonet member 52 of the intermediate tube fixed thereto. A mount member 54 rotatably fitted in a recessed portion between the support sleeve 50 and the bayonet member 52 has reference fitting diameter portion 54a, said mount member being provided with a member 54b having an optical axis opening. A pin 56 is provided for determining the coupling reference position relative to the camera side located in a predetermined position of the mount member 54. Additionally, there are provided coupling pawls (not shown) for coupling with a camera side mount of the bayonet 52, and cutout portions (not shown) of the bayonet. Transmission members 11A and 12A rotatably arranged in the intermediate body 50 engage a preset diaphragm signal transmission member 11a and an automatic diaphragm drive lever 12a, such as those shown in FIGS. 1-6, provided for a lens 60 shown schematically in FIG. 10. Between the support sleeve 50 and the mount member 54 there is provided a mount lock means similar to that shown in FIG. 2B as comprising the elements 4a, 8c, 13, 14 and 15. When the support sleeve 50 and the mount member 54 are in predetermined positions, a locking action is activated to render the support sleeve and the mount member nonrotatable. Both transmission members 11'a and 12'a are arranged to be engageable with control members of the camera side when said lock means is locked.

In FIG. 10, the phototaking lens 60 is mounted in the intermediate tube 50, and the individual members 11a, 12a of the phototaking lens 60 are engaged with the transmission members 11'a and 12'a of the intermediate tube. A pawl portion 52a constituting lens coupling preparation means is provided in a position of the bayonet opposite to the position determining pin 56 of the mount member when said mount lock means is actuated.

This pawl 52a is elongated to be almost equal to the bayonet pawl and is constructed in a manner similar to that of the embodiment of the phototaking lens. The mode for coupling and decoupling of the present intermediate tube to and from the camera body is similar to that shown with reference to FIGS. 1 to 6. In decoupling the intermediate tube, the bayonet pawls of the intermediate tube are disengaged from the camera side bayonet pawls. In the state where said mount lock means is actuated, the pawl portion 52a matched up with a slot 25a' provided in the camera side bayonet, whereby the intermediate tube is rendered detachable from the camera.

Where locking of the mount lock means is not effective even when the intermediate tube 50 is disengaged from the camera side bayonet pawl, the transmission members 11'a and 12'a are not returned to the initial positions. If the intermediate tube can be detached from the camera body in this state, inconvenience occurs in the next coupling operation. Therefore, in this case, the pawl portion 52a of the coupling preparation means engages with the camera side bayonet pawl 25d (see FIGS. 5 and 6) to prevent detachment of the intermediate tube.

Further, the present invention is applicable to various adapters employing bayonet coupling devices. In general, a filter is fastened at a threaded portion of the front end of a phototaking lens. Depending upon photographic situations or conditions, the location of the filter at the front end of the phototaking lens leads to reflection of light from the filter surface. Accordingly, an undesirable secondary reflection often occurs. By using the coupling mechanism (support tube, bayonet pawl, mount member, mount lock means, coupling preparation means) in the filter frames, it is possible to arrange the filter between the phototaking lens and the camera body. Thus, by causing the filter to be supported on the mount member, the filter can be arranged between the phototaking lens and the camera body without creating an adverse influence on the signal transmission between the phototaking lens and the camera body, and thus the aforementioned drawbacks can be eliminated.

It will be understood from the foregoing that the present invention provides a mechanism for rendering it possible to detach an interchangeable lens unit from a camera body only when the adapter shell is appropriately oriented relative to the unit coupling element, so that the operator is able to quickly couple the lens unit with the camera body with high reliability. The principles of the present invention are applicable to various camera systems having detachable mechanical units and to optical instruments.

While specific embodiments of the invention have been shown and described in detail to illustrate the application of the inventive principles, it will be understood that the invention may be embodied otherwise without departing from such principles.

What is claimed is:

1. A camera system comprising:
    A. a camera including a camera housing provided with complementary bayonet coupling means, complementary retainer means and a guide face arranged to guide a mounting operation of a lens assembly and said camera;
    B. a lens assembly adapted to be mounted and dismounted with and from said camera, said lens assembly comprising:

(a) lens barrel means provided with bayonet coupling means adapted to detachably engage said complementary bayonet coupling means of said camera housing for mounting said lens assembly on the camera housing;

(b) adapter means rotatable relative to said lens barrel means, said adapter means and said lens barrel means being arranged to be kept in a predetermined positional relationship relative to each other when said lens assembly is dismounted from said camera housing;

(c) retainer means engaging said complementary retainer means to keep said adapter means in a predetermined position relative to said camera housing during mounting and dismounting of said lens assembly with and from said camera housing;

(d) locking means for locking said adapter means and said lens barrel means when said lens assembly is dismounted from said camera housing; and (e) mounting operation enabling means for permitting said lens assembly to be mounted on said camera housing, said mounting operation enabling means being provided with a tip member which extends from a recess portion of said bayonet coupling means of said lens assembly, said tip member being arranged to be in confronting relationship with said lens retainer means at the beginning of a lens assembly mounting operation and then to engage said complementary bayonet coupling means provided on said camera housing when said lens assembly mounting action is performed, said tip member being further arranged to be disengaged from said complementary bayonet coupling means of said camera housing by passing through said complementary retainer means when said lens assembly is brought back to the dismounting position of each of said bayonet coupling means.

2. A lens assembly for a camera comprising:

(a) lens barrel means having coupling means for engaging with complementary coupling means on said camera for mounting said lens assembly on said camera;

(b) adapter means rotatable relative to said lens barrel means, said adapter means being arranged to be held in a predetermined positional relationship relative to said lens barrel means when said lens barrel means is dismounted from said camera;

(c) retainer means adapted to cooperate with complementary retainer means on said camera for holding said adapter means rotatively fixed relative to said camera; and (d) detachment enabling means for permitting detachment of said lens assembly from said camera when said lens barrel means is brought to a predetermined position by rotation relative to said adapter means, said detachment enabling means being arranged to cooperate with a recess which is provided on said camera, and to pass through said recess when said lens assembly is in a predetermined position.

3. A lens assembly according to claim 2 further comprising locking means for preventing rotation of said adapter means and said lens barrel means relative to each other, said locking means being arranged to prevent said relative rotation of said adapter means and said lens barrel means when said lens assembly is detached from said camera thereby to maintain said adapter means and said lens barrel means in a predetermined position relative to each other.

4. A lens assembly according to claim 2 wherein said detachment enabling means comprise a tip member which is provided on said coupling means, said tip member being disposed to pass through said recess when said coupling means disengages from said complementary coupling means of said camera.

5. A lens assembly according to claim 4 wherein said tip member is arranged to be brought into alignment with said complementary retainer means on said camera when said coupling means is in a position permitting release of said lens assembly from said camera.

6. A lens assembly according to claim 5 wherein said tip member is usable as indexing means whether said lens assembly is prepared for mounting said lens assembly on said camera or not.

7. A lens assembly according to claim 5 wherein said retainer means and said tip member are dimensioned with the following relationship $$T_1 \geq T_2$$

wherein $T_1$ represents the dimensions of said retainer means and $T_2$ represents the dimensions of said tip member.

8. A lens assembly according to claim 4 wherein said coupling means have a cutout portion and a pawl portion for coupling with said complementary coupling means of said camera, said tip member being formed on said cutout portion of said coupling means.

9. A lens assembly attachable and detachable to and from a camera, said lens assembly comprising:

(a) coupling means engageable with and disengageable from complementary coupling means provided on said camera;

(b) retainer means for locking said lens assembly in a predetermined position on said camera, said retainer means being arranged to be engageable with a recess which is formed on said camera;

(c) restricting means for determining a detaching position of said lens assembly, said restricting means comprising a tip member which is provided on said coupling means, said tip member being arranged to disengage by passing through said recess in detaching said lens assembly from said camera.

10. A lens assembly according to claim 9 wherein said tip member is arranged to be brought into alignment with said recess on said camera when said coupling means is in a position permitting release of said lens assembly from said camera.

11. A lens assembly for a camera comprising:

(a) lens barrel means having coupling means capable of engaging with and disengageing from complementary coupling means on said camera for mounting and dismounting said lens assembly on and from said camera;

(b) adapter means rotatable relative to said lens barrel means, said adapter means and said lens barrel means being arranged to be kept in a predetermined positional relationship relative to each other when said lens assembly is dismounted from said camera;

(c) retainer means arranged to cooperate with complementary retainer means on said camera for keeping said adapter means fixed relative to said camera; and (d) detachment enabling means for allowing said lens assembly to detach from said camera, said detachment enabling means having preventing means movably mounted in said lens assembly, said preventing means engaging with said complementary coupling means for preventing detachment from said camera when said lens barrel means is not in a predetermined position relative to said adapter means, said preventing means being moved to a disengaging position in said lens assembly when said lens barrel means is in a specific position relative to said adapter means.

12. A lens assembly according to claim 11 further comprising locking means arranged to hold said lens barrel means and said adapter means in a locked state when said lens assembly is dismounted from said camera and also when said lens assembly is mounted on said camera.

13. A lens assembly according to claim 12 wherein said preventing means is adapted to be pushed in a radial direction relative to an optical axis of said assembly to engage with said complementary coupling means by said locking means when said lens barrel means is not in a detachment position from said camera.

14. A lens assembly for a camera comprising:
(a) lens barrel means having coupling means arranged to engage with complementary coupling means disposed on said camera for mounting said lens assembly on said camera;
(b) adapter means rotatable relative to said lens barrel means, said adapter means being arranged to be maintained in a predetermined positional relationship relative to said lens barrel means when said lens assembly is dismounted from said camera, said adapter means having retainer means adapted to cooperate with complementary retainer means on said camera for holding said adapter means rotatively fixed relative to said camera;
(c) locking means for preventing rotation of said adapter means and said lens barrel means relative to each other, said locking means being arranged to prevent said relative rotation of said adapter means and said lens barrel means when said lens assembly is detached from said camera thereby to maintain said adapter means and said lens barrel means in a predetermined position relative to each other; and
(d) detachment preventing means arranged to cooperate with said complementary retainer means to prevent said lens assembly from being detached from said camera when said lens barrel means is not in a predetermined position relative to said camera and to permit said lens assembly to detach from said camera when said lens barrel means is in a predetermined position relative to said camera;
(e) said detachment preventing means including an indexing member extending from said coupling means, said indexing member being arranged to be brought into alignment with said complementary retainer means on said camera when said coupling means is in a position permitting release of said lens assembly from said camera;
(f) said complementary retainer means on said camera comprising a recess formed in said complementary coupling means of said camera, said retainer means being disposed on said adapter means and comprising an engaging member which is arranged to engage with said recess, said indexing member being disposed to pass through said recess when said coupling means disengages from said complementary coupling means of said camera.

15. A lens assembly according to claim 14, wherein said retainer means and said indexing member are dimensioned with the following relationship $$T_1 \geq T_2$$

wherein $T_1$ represents the dimensions of said retainer means and $T_2$ represents the dimensions of said indexing member.

* * * * *